United States Patent Office 2,985,673
Patented May 23, 1961

2,985,673
POLYMERIZATION CATALYSTS

Robert James Convery, Wilmington, Del., assignor to E. I. du Pont de Nemours and Company, Wilmington, Del., a corporation of Delaware No Drawing. Filed Nov. 4, 1957, Ser. No. 694,080

10 Claims. (Cl. 260—408)

The present invention relates to novel catalysts for the polymerization of ethylenically unsaturated monomers and more particularly to polymerization catalysts comprising novel salts of tetravalent lead and fluorocarbon acids.

It was heretofore known that fluorocarbon acids could be reacted with metal oxides, hydroxides and carbonates to form the corresponding metal salts. Thus U.S. 2,567,011, issued to A. R. Diesslin and E. A. Kauck, September 4, 1951, discloses the formation of divalent lead salts employing an aqueous solution of a completely fluorinated acid. The lead salt of n-heptafluorobutyric acid is said to soften at 270° C. without melting, thus showing that the lead salts known heretofore are both hydrolytically and temperature stable.

In accordance with the present invention it was discovered that salts of tetravalent lead and fluorocarbon acids having the general formula

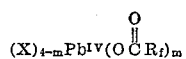

wherein $R_f$ is a member of the class consisting of perfluorocarbon and omega-hydroperfluorocarbon radicals, X is a member of the class consisting of hydrocarbon, acyl and halogen radicals and $m$ is a number from 1 to 4 inclusive, are active polymerization catalysts.

The novel tetravalent lead fluorocarboxylates in contrast to the divalent lead salts, are highly reactive and decompose on contact with water and are therefore employed in polymerization methods using non-aqueous media. The catalytic activity of the lead salts varies with their chemical structure, but, generally, the catalysts are sufficiently active to be effective over a wide range of temperature conditions varying from room temperature to 300° C. The catalysts may be employed in bulk polymerizations, where the monomer is liquid, or may be employed in the polymerization of gaseous monomers at pressures ranging from atmospheric pressure to pressures above 3000 atmospheres in the presence of inert solvents. The catalysts are particularly useful in the polymerization of fluorinated monomers such as tetrafluoroethylene, chlorotrifluoroethylene and hexafluoropropylene as well as in the copolymerization of these monomers with ethylenically unsaturated monomers copolymerizable therewith. As stated hereinabove the catalysts of the present invention are employed in non-aqueous systems. Particularly suitable reaction media for the polymerization with the novel catalyst of the present invention are perfluorinated hydrocarbon solvents and other fluorinated solvents inert towards the monomer and catalyst.

The novel tetravalent lead fluorocarboxylates are in general prepared by the reaction of a tetravalent lead compound with a fluorocarbon acid. Several methods may be employed. One method comprises the reaction of tetravalent lead oxides with fluorocarbon acids in the presence of a fluorocarbon acid anhydride to take up the water released by the reaction of the oxide and the acid. The removal of water is necessary to prevent the decomposition of the tetravalent lead salt. The reaction is carried out at room temperature in the absence of moisture and oxygen. Stoichiometric quantities of the acid and the oxide are sufficient, although the acid is generally employed in excess quantities. The quantity of the anhydride must be sufficient to take up the water formed; in general, the anhydride and the acid may also serve as the reaction medium, in which instance relatively large quantities thereof are employed. In a second method an excess of the fluorocarbon acid is reacted with a lead tetraacylate such as a lead tetraacetate, lead tetrabutyrate, lead tetrabenzoate, etc. The acyl radical of the lead salt is exchanged for the fluoroalkanoic radical and the resulting acid is removed by distillation or other means under conditions which will not cause the distillation or removal of the fluorocarbon acid. The degree of removal of said acyl radical determines the composition of the mixture which is obtained. In a third method an excess of the fluorocarbon acid is reacted with a lead tetraalkyl such as lead tetraethyl, lead tetrabutyl, lead tetramethyl, lead tetraphenyl, lead dimethyldiethyl, etc. Ethane or the corresponding hydrocarbon is liberated by the reaction and vaporizes from the reaction mixture. Other means for removal of the hydrocarbon are employed where the hydrocarbon will not vaporize at reaction temperatures. To the extent that the ethane is released, an organometallic tetravalent lead salt is obtained. In a fourth method a tetravalent lead halide such as a bromide, chloride, fluoride or iodide, is reacted with a fluorocarbon acid in the presence of a silver salt of a fluorocarbon acid. Silver halide is precipitated from the reaction mixture and the lead salt is formed. Depending on the quantity of the silver salt employed a mixed salt of a pure lead-IV-fluorocarboxylate is obtained. Various modifications of these reactions may be employed to form the novel catalysts of the present invention. Thus it is possible to employ a mixture of fluorocarbon acids, or it is possible to employ an anhydride or silver salt which is not derived from the acid employed in combination with the anhydride or silver salt.

The fluorocarbon acids employed in the formation of the catalysts of the present invention are fluorinated acids having the general formula

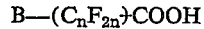

where B is a member of the class consisting of hydrogen and fluorine and $n$ is an integer of one and greater. Although the formation of the tetravalent lead salts is not limited by the number of carbon atoms in the fluorocarbon radical, it is, in general, preferred to employ acids having less than 11 carbon atoms since these are more readily available and less costly. Completely fluorinated or perfluorinated acids may be prepared by electrolysis of alkanoic acids in substantially anhydrous hydrogen fluoride followed by hydrolysis of the result fluorinated acid fluoride. The omega-hydroperfluoro-acids may be prepared by the oxidation of omega-hydroperfluoroalcohols as disclosed in U.S. 2,559,629 issued July 10, 1951 to K. L. Berry. The omega-hydroperfluoro-alcohols are obtained by the polymerization of tetrafluoroethylene in the presence of methanol as a telomer, as disclosed in U.S. 2,599,628 issued July 10, 1951 to R. M. Joyce. Examples of acids which are employed in the process of the present invention are trifluoroacetic acid, perfluorobutyric acid, hexafluorobutyric acid, perfluoroheptanoic acid, dodecafluoroheptanoic acid, hexadecafluorononanoic acid, octafluoropentanoic acid, etc. The anhydride employed in the process of the present invention may be prepared from the acids by known techniques.

The catalysts of the present invention are highly reactive towards moisture and thus difficult to isolate and maintain in the pure state. However, the composition of the lead salts may be obtained by iodometric titration and by analysis of hydrolysis products. Because of their instability the catalysts of the present invention are preferably employed in the polymerization in the form of a solution in the medium in which they are formed.

The present invention is further illustrated by the following examples:

*Example I*

A mixture of 26 g. of trifluoroacetic acid, 15 g. of trifluoroacetic anhydride and 7.5 g. of red lead oxide ($Pb_3O_4$) was stirred for a total of 48 hours under anhydrous conditions. The resulting yellow-green colored solution was cooled to 0° C. Lead tetraperfluoroacetate crystallized from the solution in the form of white needles and was isolated by filtration.

Into an 80 ml. stainless steel autoclave was charged 30 ml. of perfluorodimethylcyclobutane containing 0.2 g. of lead tetraperfluoroacetate. The reaction vessel was then pressured with tetrafluoroethylene. The reaction mixture was heated to 90° C. and the pressure increased to 400 p.s.i.g. by the addition of further tetrafluoroethylene. The reaction mixture was agitated at that temperature for 2.5 hours. On cooling of the reaction mixture, excess monomer was vented off and the reaction mixture was filtered. The product was washed and dried; 28.6 g. of high molecular weight polytetrafluoroethylene was obtained.

*Example II*

A mixture of 25 g. of trifluoroacetic acid, 10 g. of trifluoroacetic anhydride and 7.5 g. of red lead oxide was stirred for 72 hours under anhydrous conditions at room temperature.

A 1.7 g. sample of this mixture was charged to an 80 ml. autoclave together with 30 ml. of perfluorodimethylcyclobutane. The reaction vessel was then pressured with tetrafluoroethylene and heated until a pressure of 400 p.s.i.g. and a temperature of 95° C. was obtained. Polymerization was continued with agitation at that pressure and temperature for one hour. On filtering the reaction mixture, washing and drying the product, 44.0 g. of polytetrafluoroethylene was obtained.

A mixture of 35 g. of trifluoroacetic acid, 14 g. of trifluoroacetic anhydride and 4.5 g. of lead monoxide was stirred for 72 hours under anhydrous conditions at room temperature.

A 1.79 g. aliquot of this mixture was employed in the polymerization of tetrafluoroethylene employing the procedure described above. No polymerization of tetrafluoroethylene occurred.

*Example III*

A mixture of 17.1 g. of perfluorobutyric acid, 8.4 g. of trifluoroacetic anhydride and 6.9 g. of red lead oxide ($Pb_3O_4$) was stirred at room temperature under anhydrous conditions. After 96 hours an additional 1.6 g. of trifluoroacetic anhydride was added and stirring was continued for an additional 24 hours. After this period the reaction mixture had only a slight orange tint indicating essentially complete reaction of the lead oxide and formation of tetravalent lead.

A 3.4 g. aliquot of the solution was placed into an 80 ml. stainless steel autoclave. To this was added 30 ml. of perfluorodimethylcyclobutane. The autoclave was heated to 52° C. and pressured to 200 p.s.i.g. with tetrafluoroethylene causing the polymerization to start. The polymerization was continued with agitation for 1.25 hours, the temperature varying from 52° C. to 140° C. and the pressure varying from 150 to 300 p.s.i.g. during the polymerization. A total of 25 g. of tetrafluoroethylene was polymerized during that period.

*Example IV*

Trifluoroacetic acid (30 g.) was cooled in an ice bath to 0° C., and 2 ml. of tetraethyl lead was slowly added to the cooled acid. There was an immediate evolution of gas. After addition the reaction mixture was warmed to room temperature and stirred for one hour. The mixture was then sparged with nitrogen at room temperature. A light yellow solution was obtained. The reaction mixture was identified as a solution of

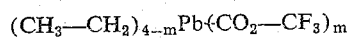
$(CH_3-CH_2)_{4-m}Pb(CO_2-CF_3)_m$ in trifluoroacetic acid.

A 3 g. aliquot of the solution was charged to an 80 ml. stainless steel autoclave together with 30 ml. of perfluorodimethylcyclobutane. The vessel was then pressured with gaseous tetrafluoroethylene and heated. The polymerization was carried out at a pressure of 200 to 400 p.s.i.g. and at a temperature of 65° to 95° C. for a period of 35 minutes under continuous agitation. The resulting reaction mixture was filtered and the product was washed and dried. The yield of solid polytetrafluoroethylene was 10.5 g.

*Example V*

A mixture of 3.07 g. of octafluoropentanoic acid and 1.27 g. of lead tetraacetate was stirred under anhydrous conditions at room temperature until solution of the tetraacetate was complete. The solution was then sparged with nitrogen for 30 minutes at a pressure of 0.3 mm. of mercury to remove the acetic acid formed. Analysis showed the dissolved product as having the following composition:

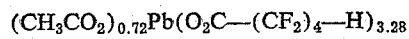
$(CH_3CO_2)_{0.72}Pb(O_2C-(CF_2)_4-H)_{3.28}$

A 0.52 g. aliquot of the solution and 30 ml. of perfluorodimethylcyclobutane were placed in an 80 ml. stainless steel autoclave. The vessel was charged with gaseous tetrafluoroethylene until a pressure of 200 p.s.i.g. was obtained. The autoclave was heated to 50° C. and the tetrafluoroethylene pressure increased to 400 p.s.i.g. Polymerization was continued with agitation for one hour. The resulting reaction mixture was filtered, and the polymer washed and dried. The dry polymer weight 8.9 g.

The experiments were repeated with dodecafluoroheptanoic acid and hexadecafluorononanoic acid. Similar results were obtained.

*Example VI*

A mixture of 41 g. of dodecafluoroheptanoic acid, 10.5 g. of trifluoroacetic anhydride and 6.6 g. of red lead oxide was stirred at room temperature for a period of 72 hours. An additional 2 g. of trifluoroacetic anhydride and 10 g. of the acid was added to allow the reaction to go to completion. The resulting reaction mixture was diluted with 20 ml. of dimethylperfluorocyclobutane and agitated for an additional 24 hours.

A 9.3 g. aliquot of the resulting product and 30 ml. of perfluorodimethylcyclobutane were placed into an 80 ml. stainless steel autoclave. The vessel was charged with tetrafluoroethylene until a pressure of 200 p.s.i.g. was obtained. The polymerization was carried out at a temperature of 50 to 110° C. and a pressure of 100 to 300 p.s.i.g. for 15 minutes with agitation. A solid polymer of tetrafluoroethylene was recovered.

*Example VII*

A mixture of 50 ml. of trifluoroacetic acid and 8.8 g. of silver trifluoroacetate was cooled to 0° C. and 3.5 g. of lead tetrachloride was added with mild agitation. On complete addition of the lead tetrachloride the reaction mixture was allowed to warm to room temperature and stirred for 30 minutes at room temperature. The reaction mixture was filtered to remove the precipitated silver chloride. The remaining solution was found to be a 1% solution of tetravalent lead trifluoroacetate.

A 10 g. aliquot of the solution and 30 ml. of perfluorodimethyl-cyclobutane was placed into an 80 ml. stainless steel autoclave. The vessel was charged with tetrafluoroethylene and heated until a pressure of 400 p.s.i.g.

and a temperature of 75° C. was obtained. Polymerization was continued at these conditions for 90 minutes. On washing up the resulting reaction mixture 5.5 g. of a high molecular weight polytetrafluoroethylene was isolated.

*Example VIII*

Into a 320 ml. stainless steel autoclave was charged 50 ml. of perfluorodimethylcyclobutane, 4.4 g. of the lead tetraperfluoroacetate solution of Example II, 30 g. of hexafluoropropylene and 15 g. of tetrafluoroethylene. The autoclave was heated to 90° C. and agitated for 2.5 hours. The reaction mixture was removed and filtered. The solid polymer isolated was washed and dried and was found to weigh 6.3 g. Infrared analysis showed the product to be a copolymer of hexafluoropropylene and tetrafluoroethylene.

*Example IX*

Into a 320 ml. stainless steel autoclave was charged 50 ml. of perfluorodimethylcyclobutane, 3.0 g. of the catalyst solution of Example II, 30 g. of hexafluoropropylene and 10 g. of tetrafluoroethylene. The reaction mixture was heated to 60° C. and agitated at that temperature for a period of 1.5 hours. The autoclave was then cooled, and the contents were removed and filtered. The resulting polymer was washed with hydrochloric acid and water and thereafter dried in a vacuum oven. A solid copolymer of tetrafluoroethylene and hexafluoropropylene weighing 10 g. was obtained.

*Example X*

Into a glass reaction vessel was charged 30 ml. of perfluorodimethylcyclobutane, 5 g. of hexadecafluorononanoic acid and 0.12 g. of lead tetraacetate. The reaction mixture was heated to 50 to 60° C. under reduced pressure for a period of 30 minutes, while sweeping the reaction mixture with a stream of nitrogen to remove the acetic acid released by the reaction. The resulting mixture was placed into an 80 ml. stainless steel autoclave, pressured to 300 p.s.i.g. with tetrafluoroethylene and agitated for a period of 20 minutes. The temperature increased to 100° C. and the pressure to 360 p.s.i.g. during the reaction and then decreased to room temperature and 150 p.s.i.g. A high molecular weight, solid polymer of tetrafluoroethylene was separated from the resulting reaction mixture.

*Example XI*

Into an 80 ml. stainless steel autoclave was charged 30 ml. of perfluorodimethylcyclohexane, 3.5 g. of the lead tetraperfluoroacetate solution of Example II and 15 g. of tetrafluoroethylene. The reaction mixture was agitated for a period of 1.5 hours at 95° C. under autogeneous pressure. After filtration, washing and drying, a solid polymer of tetrafluoroethylene weighing 12.4 g. was obtained.

*Example XII*

Into a 320 ml. stainless steel autoclave was charged 50 ml. of perfluorodimethylcyclohexane, 5.5 g. of the lead tetraperfluoroacetate solution of Example II, 30 g. of hexafluoropropylene and 10 g. of tetrafluoroethylene. The reaction mixture was agitated for a period of 1.5 hours at 95° C. under autogeneous pressure; on filtration, washing and drying of the resulting reaction mixture 8.7 g. of a copolymer of hexafluoropropylene and tetrafluoroethylene containing 15% of hexafluoropropylene was obtained. The copolymer was found to have a melt viscosity of $1.4 \times 10^5$ poises and could be molded into tough films which could be flexed 14000 times without break.

*Example XIII*

Into an 80 ml. stainless steel autoclave was charged 30 ml. of perfluoroacetic acid and 0.5 g. of the catalyst solution of Example II. The vessel was pressured with tetrafluoroethylene to a pressure of 200 p.s.i.g. and heated to a temperature of 70° C. The reaction mixture was agitated and polymerization was continued for 10 minutes while maintaining temperature at 70° to 115° C. and pressure at 200 to 400 p.s.i.g. The polytetrafluoroethylene isolated from the reaction mixture weighed 39.4 g. and could be molded into tough films and solid shapes.

*Example XIV*

Into an 80 ml. stainless steel autoclave was charged 23 ml. of perfluorodimethylcyclobutane, 12 g. of perfluoroheptene-1, 15 g. of tetrafluoroethylene and 4.4 g. of the lead tetraperfluoroacetate solution of Example II. The reaction mixture was heated under autogeneous pressure to 95° C. for a period of 30 minutes with agitation. The reaction temperature increased to 232° C. during the polymerization. On washing and drying 25.9 g. of a solid copolymer of tetrafluoroethylene and perfluoroheptene-1 was obtained from the polymerization mixture. The copolymer was found to have considerable melt flow at 345° C.

The foregoing examples illustrate the catalytic activity of the novel tetravalent lead salts of the present invention. Although the lead-IV-perfluorocarboxylates are of primary usefulness in the polymerization of fluorinated monomers, these catalysts may also be employed in the polymerization of unfluorinated ethylenically unsaturated monomers. Polymerization procedures which do not require an aqueous medium and allow reaction temperatures above room temperature may be employed with the catalysts of the present invention. The catalysts of the present invention are particularly useful for the polymerization of fluorinated monomers in that they provide fluorocarbon end groups for the polymers which increases the thermal stability of the polymers prepared with the catalysts of the present invention.

I claim:

1. A catalyst composition of matter comprising a tetravalent lead perfluorocarboxylate having the general formula

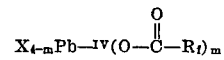

where $R_f$ is a member of the class consisting of perfluorocarbon and omega-hydroperfluorocarbon radicals, X is a member of the class consisting of hydrocarbon, acyl and halogen radicals and $m$ is a number from 1 to 4 inclusive.

2. A catalyst composition of matter comprising a tetravalent lead perfluorocarboxylate having the general formula

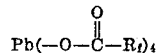

where $R_f$ is a member of the class consisting of perfluorocarbon and omeba-hydroperfluorocarbon radicals.

3. A catalyst composition of matter comprising lead tetraperfluoroacetate.

4. A catalyst composition of matter comprising lead tetraperfluorobutyrate.

5. A catalyst composition of matter comprising a tetravalent lead perfluorocarboxylate having the general formula:

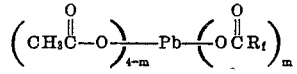

where $R_f$ is a member of the class consisting of perfluorocarbon radicals and omega-hydroperfluorocarbon radicals and $m$ is a number from 1 to 4 inclusive.

6. A catalyst composition of matter as set forth in claim 5 wherein $R_f$ is octafluorobutyl.

7. A catalyst composition of matter as set forth in claim 5 wherein $R_f$ is dodecafluorohexyl.

8. A catalyst composition of matter as set forth in claim 5 wherein $R_f$ is hexadecafluorooctyl.

9. A catalyst composition of matter comprising, a tetravalent lead perfluorocarboxylate having the general formula

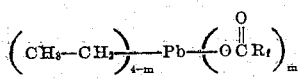

where $R_f$ is a member of the class consisting of perfluorocarbon radicals and omega-hydroperfluorocarbon radicals and $m$ is a number from 1 to 4 inclusive.

10. A catalyst composition of matter comprising a tetravalent lead perfluorocarboxylate having the general formula

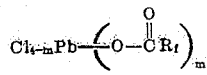

where $R_f$ is a member of the class consisting of perfluorocarbon and omega-hydroperfluorocarbon radicals and $m$ is a number from 1 to 4 inclusive.

References Cited in the file of this patent

UNITED STATES PATENTS

| | | |
|---|---|---|
| 2,416,074 | Weber | Feb. 18, 1947 |
| 2,456,255 | Coffman | Dec. 14, 1948 |
| 2,559,628 | Joyce | July 10, 1951 |
| 2,559,629 | Berry | July 10, 1951 |
| 2,559,749 | Benning | July 10, 1951 |
| 2,567,011 | Diesslin et al. | Sept. 4, 1951 |
| 2,584,041 | Nowak et al. | Jan. 29, 1952 |